United States Patent [19]

Freiwald et al.

[11] Patent Number: 4,844,278
[45] Date of Patent: Jul. 4, 1989

[54] FUEL TANK FOR VEHICLES WITH FUEL MOVEMENT CALMING ARRANGEMENT

[75] Inventors: Wolfgang Freiwald, Aichwald; Horst Ebert, Plüderhausen, both of Fed. Rep. of Germany

[73] Assignee: Daimler-Benz Aktiengesellschaft, Stuttgart, Fed. Rep. of Germany

[21] Appl. No.: 128,469

[22] Filed: Dec. 3, 1987

[30] Foreign Application Priority Data

Dec. 3, 1986 [DE] Fed. Rep. of Germany ....... 3641356

[51] Int. Cl.⁴ ............................................. B65D 90/52
[52] U.S. Cl. ...................................... 220/1 V; 220/22
[58] Field of Search ......................... 220/1 V, 5 A, 22

[56] References Cited

U.S. PATENT DOCUMENTS

| | | | |
|---|---|---|---|
| 1,462,347 | 7/1923 | Kamer | 220/22 |
| 1,616,008 | 2/1927 | Stout | 220/22 |
| 1,713,170 | 5/1929 | Daviss | 220/22 |
| 2,806,622 | 9/1957 | Leirer | 220/22 |
| 3,979,005 | 9/1976 | Robinson | 220/22 |
| 4,179,036 | 12/1979 | Pasini . | |
| 4,611,724 | 9/1986 | Walkins | 220/22 |

FOREIGN PATENT DOCUMENTS

| | | |
|---|---|---|
| 0194909 | 9/1986 | European Pat. Off. . |
| 234062 | 9/1925 | United Kingdom ................. 220/22 |
| 586093 | 3/1947 | United Kingdom . |
| 1217403 | 12/1970 | United Kingdom . |
| 1283890 | 8/1972 | United Kingdom . |
| 1358073 | 6/1974 | United Kingdom . |
| 1359458 | 7/1974 | United Kingdom . |
| 2164293 | 3/1986 | United Kingdom . |

Primary Examiner—George E. Lowrance
Attorney, Agent, or Firm—Barnes & Thornburg

[57] ABSTRACT

A fuel tank for vehicles is constructed so that any disturbing generation of noise in the fuel tank due to swashing fuel, particularly during acceleration and deceleration, is prevented. For this purpose wall sections of the fuel tank are equipped internally with a structured surface forming stabilization chambers.

At the fuel-free regions of these walls sections, the swashing wave front of the fuel is dissolved over a large area, by the surface structure, into a plurality of wave sections which are distributed and diverted, whereby fuel movements which customarily generate swashing noises are effectively attenuated.

25 Claims, 4 Drawing Sheets

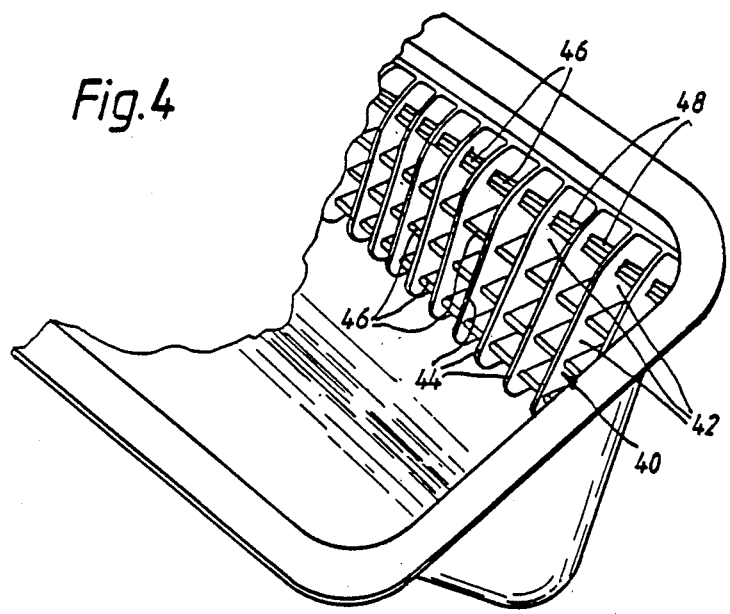
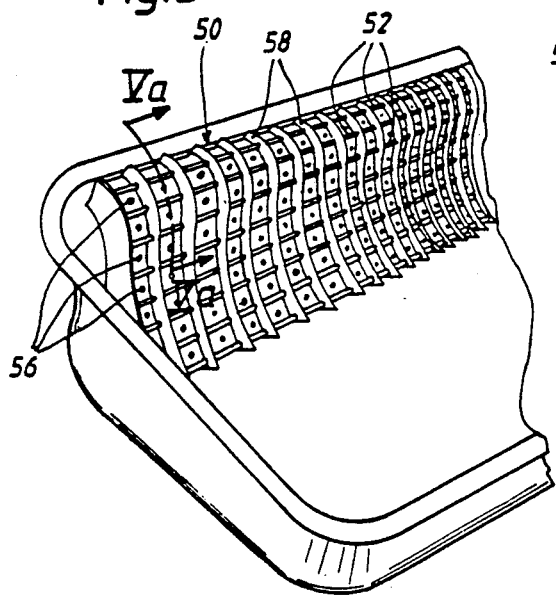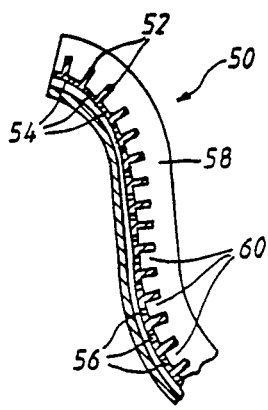

FUEL TANK FOR VEHICLES WITH FUEL MOVEMENT CALMING ARRANGEMENT

BACKGROUND AND SUMMARY OF THE INVENTION

The invention relates to a fuel tank for vehicles with devices to stabilize or calm the movements of the fuel.

It is already known to provide bulkhead walls or similar fixtures in fuel tanks; see German Pat. No. (DE-PS) 861 969. They serve to prevent fuel movements in the interior of the tank, which occur towards the outside of the curve when travelling through curves due to the influence of the centrifugal forces in action.

However, in spite of a certain calming of the fuel achieved by this means, fuel movements still remain, which in cooperation with parts of the tank walls cause noises, particularly during acceleration and deceleration, which can be found disturbing in a generally quiet vehicle.

It is therefore an object of the invention to prevent in fuel tanks a disturbing degree of such noises.

This object is achieved according to the invention by providing wall parts of the fuel tank exhibiting an internal structured surface forming calming chambers.

Due to their surface structure, the tank wall parts constructed according to the invention dissolve the wave front of the impinging fuel into a plurality of wave sections over a large area, and distribute and divert it, so that the force of the oncoming mass of fuel is effectively attenuated and swashing noises are thus reduced so that they are no longer audible in the interior of the vehicle.

The invention contemplates different constructions of the structured surface of the tank wall parts, which forms the calming chambers, for an effective reduction of swashing noises.

Such surface structures are formed directly on corresponding tank wall parts, which is particularly recommended in the case of fuel tanks blow molded from plastics in certain preferred embodiments. In the case of fuel tanks produced from sheet metal shells, on the other hand, advantageous preferred embodiments provide that the structured surface belongs to a tank insert applied to a tank wall, which is conveniently also retained in contact with the tank wall for the purpose of attenuation (frictional attenuation).

Other objects, advantages and novel features of the present invention will become apparent from the following detailed description of the invention when considered in conjunction with the accompanying drawings.

BRIEF DESCRIPTION OF THE DRAWINGS

FIG. 4 shows, in a perspective view, a detail of a second exemplary embodiment of a tank insert exhibiting a correspondingly structured surface;

FIG. 5 shows a similar detail of a third exemplary embodiment of tank insert;

FIG. 5a shows a partial cross-section through the tank insert according to FIG. 5, taken along the line Va—Va of FIG. 5.

DETAILED DESCRIPTION OF THE DRAWINGS

Figure 1:
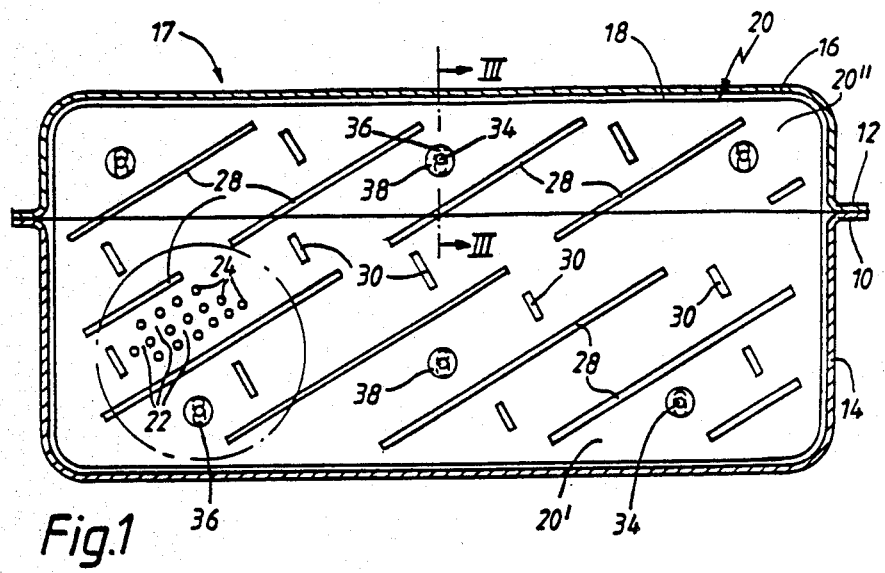
FIG. 1 shows a longitudinal section through a fuel tank constructed in accordance with a first preferred embodiment of the invention, which exhibits a structured surface forming calming chambers on the inside of its wall section, located in front in the direction of travel, for example, which belongs to a tank insert applied to this wall section.
Figure 3:
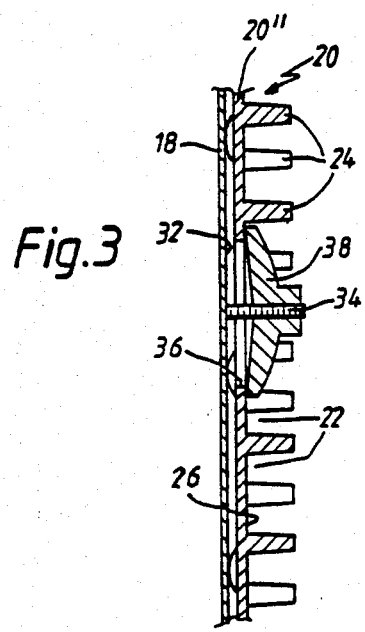
FIG. 3 shows a partial section along the line III—III of FIG. 1 on a larger scale.

FIG. 1 shows a fuel tank 17 formed from two shaped sheet metal shells 14 and 16 welded together along external flanges 10, 12, which tank is parallelepipedic for example. To the interior of its front tank wall 18, considered in the direction of travel, a tank insert generally designated 20 is applied, being composed of two substantially laminar insert sections 20', 20'' consisting of fuel-resistant plastics, polyamide for example, which have been separately applied respectively to the relevant front wall section 18 of the two shaped sheet metal shells 14 and 16 before they are welded together, so that they follow the wall contour and are pressed against the latter, at least in some regions.

That side of the tank insert 20 facing away from the front tank wall 18 exhibits such a surface structure that the front of fuel waves which strike particularly the fuel-free regions of the tank inserts 20, during deceleration of the relevant vehicle for example, are dissolved, distributed, diverted in a large area and their force is therefore effectively attenuated and disturbing swashing noises are thus prevented.

The insert surface which has the attenuating effect forms for this purpose calming chambers 22 disposed in close formation and communicating mutually. They are formed by pinlike relatively tall knots 24 which are of circular cross-section, for example, and are arranged standing vertically on a plane surface 26 of the tank insert 20. The knots 24 preferably widen conically towards the plane surface 26.

Figure 2:
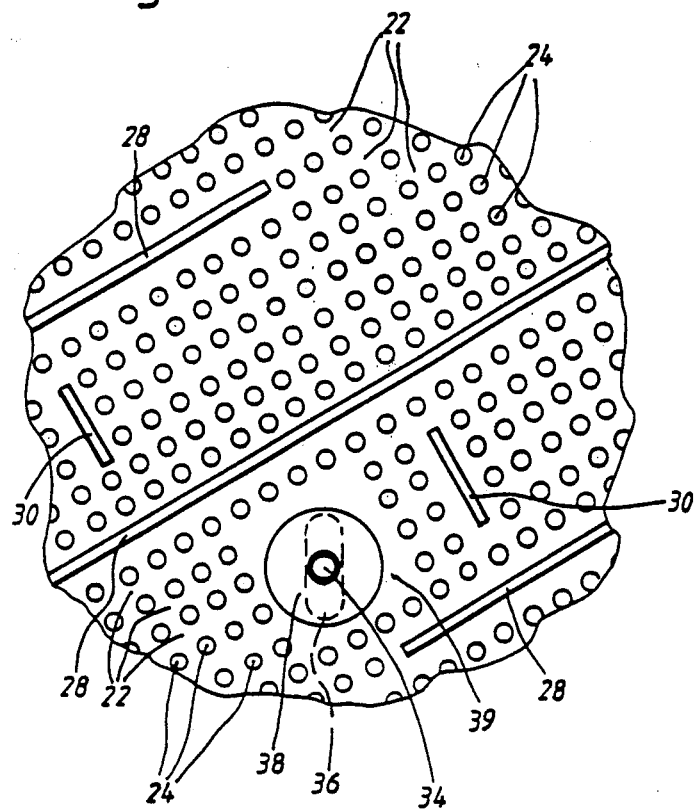
FIG. 2 shows a detail from FIG. 1, indicated by a chain-dotted circle in FIG. 1, on a larger scale.

As FIG. 2 shows, the knots 24 are provided in rows, knots 24 of adjacent knot rows being mutually associated so that knots 24 of an adjacent knot row are mutually opposite on both sides at an interval between the knots 24 of a knot row. As may be seen from FIG. 1, guide fins 28 are provided between the knots 24, distributed across the, surface 26. They form straight bars which preferably have the height of the knots 24. With reference to FIG. 1, these guide fins 28 may extend integrally in the vertical direction over the entire height of the tank insert; i.e. the fins 28 would extend vertically over the entire height rather than only partially as illustrated in FIG. 1.

However, an arrangement according to FIG. 1 is preferred, in which the guide fins 28 are provided at an oblique angle of preferably 45° and a plurality of guide fins 28 located consecutively aligned at an interval are provided simultaneously. The guide fins 28 divert the wave front, which is dissolved by the calming of chambers 22 and the knots 24 into a plurality of wave sections, into an obliquely upward direction, whereby the flow path is lengthened and thus the attenuation is positively still further improved. This purpose is further served by barlike baffles 30 provided in the regions between adjacent guide fins 28, some of which are provided particularly in the lateral region of the interval of mutually aligned guide fins 28.

The guide fins 28 may also have an orientation departing from their straight orientation, and possibly exhibit varying height, according to other contemplated embodiments. The physical arrangement of barlike baffles 30 may also differ from that illustrated.

The attachment of the insert section 20' and 20" is preferably effected by retaining bolts 34 attached by welding to the interior 32 of the front tank wall 18, each bolt protruding through a slot 36 of the insert sections 20', 20". A retaining washer 38, preferably made of fuel-resistant plastics, is fitted self-retainingly on each of these bolts, and is braced against the plane surface 26 of the insert sectiuons 20', 20" within a region 39 free of knots 24.

FIG. 4 shows a detail of a second exemplary embodiment of a tank insert, generally designated 40, which is intended, for example, for a tank wall which has an obliquely rising configuration arcuately outwards in the upper wall region. This tank insert 40 would be of flat construction in the case of a plane configuration of the relevant tank wall, according to other preferred embodiments.

The FIG. 4 embodiment is characterized by calming chambers 42, preferably square in plane, which are formed by a fin structure applied to a surface of the tank insert 40. This structure exhibits a plurality of horizontally and vertically extending fins 44, 46, of which the vertically oriented fins 44 preferably have a greater height than the horizontally oriented fins 46.

As may be seen from FIG. 4, the calming chambers 42 arranged honeycomb fashion are preferably also intercommunicating. This is effected, for example, in that the vertical fins 44 exhibit holes 48, through which the horizontal fins 46, which are constructed lower in height, extend at appropriate lateral intervals. For the sake of simplicity, the holes 48 are indicated only at the top fin 46.

A variant of construction of this embodiment is shown in FIG. 5. This tank insert 50 forms a shaped element which exhibits, on its side facing the fuel, horizontally extending fins 52 of low height, preferably between 2 and 5 mm, at short mutual intervals. The intervals between these fins 52 are bridged by wall sections 54. These wall sections 54 are preferably further penetrated in some regions by apertures 56, 58 designates barlike fins extending transversely to the horizontal fins 52, the height of which corresponds to a multiple, preferably four to five times, the height of the fins 52. These fins 58 form guide fins, which may optionally also extend obliquely to the horizontal, and which conjointly with the horizontal fins 52 form mutually laterally partitioned calming chambers 60, the bottom apertures 56 of which further contribute to an improvement in the desired attenuation effect.

Figure 6:
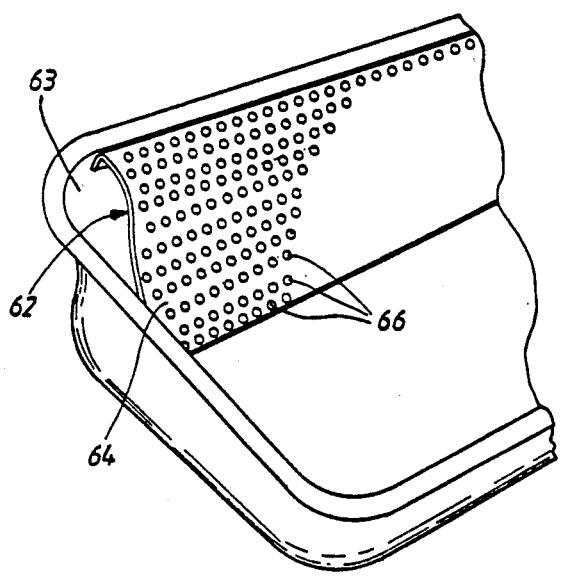
FIG. 6 shows a fourth exemplary embodiment of a tank insert.

In the exemplary embodiment according to FIG. 6 the tank insert 62 forms a flexible covering, perforated in sieve fashion, of a fuel tank wall 63. It comprises a plate 64 made of fuel-resistant, resiliently yielding plastic material. In this case the calming chambers are formed by perforations 66 (hole profile) of circular cross-section provided in close mutual association and penetrating the plate 64. It is however also contemplated to provide a perforated sheet metal plate instead of the plastics plate 64 according to other preferred embodiments.

All the exemplary embodiments of the invention which have been described are fundamentally suitable, with appropriate configuration, to be attached to any desired wall section of fuel tanks. However, satisfactory results as regards the desired noise attenuation are already achieved by an equipment of only the tank front wall 18 with an appropriate tank insert according to certain preferred embodiments of the invention.

In the case of fuel tanks fabricated from plastics, the embodiments of tank inserts according to FIGS. 1 to 5a can be moulded directly onto the relevant tank wall by slight variations depending on production techniques.

In such cases the components of these tank inserts 20, 40, 60 which form the calming chambers 22, 42, 60 are created by elevated structures. Depressions machined or moulded into a surface of such tank inserts may also be provided in order to form stabilization chambers.

The embodiment according to FIG. 6 is suitable with particular advantage for the partial or total lining of fuel tanks, since it is not necessary to give it a configuration specifically adapted to the spatial shape of the tank or tank walls.

In especially preferred embodiments, the depth of the stabilization chambers is less the 1/10 of the distance between the front tank wall and a facing rear tank wall.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Fuel tank for vehicles comprising fuel tank wall means defining a fuel storage space, said tank wall means including first and second tank wall sections which face one another and are spaced from one another, and fuel calming chamber means adjacent said first tank wall section and opening toward the second tank wall section, said fuel calming chamber means including a plurality of immediately adjacent fuel calming chambers which open toward one another in a direction substantially parallel to said first tank wall section and which open toward the second tank wall section, said calming chamber means being defined by protrusions extending from the first tank wall section in a direction toward the second wall section at a distance corresponding to a small fraction of the distance between the first and second wall sections, whereby said calming chamber means serve to dissolve and distribute fuel wave fronts into a plurality of wave sections over a large wall section area and effectively attenuate fuel swashing noises during movement of the fuel in the fuel tank during vehicle driving.

2. Fuel tank according to claim 1, wherein said calming chambers are distributed over substantially all areas of said first tank wall section.

3. Fuel tank according to claim 1, wherein further tank wall sections are also provided with fuel calming chamber means similar to the fuel calming chamber means on said first tank wall section.

4. Fuel tank according to claim 1, wherein the depth of the respective fuel calming chambers in a direction facing towards the other tank wall section is less than one-tenth of the distance between the first and second tank wall sections.

5. Fuel tank according to claim 4, wherein said calming chambers are distributed over substantially all areas of said first tank wall section.

6. Fuel tank according to claim 5, wherein said fuel tank is shaped as a parallelepiped, said first tank wall section being a front tank wall of the tank and said second tank wall section being a rear tank wall section with said fuel tank in a vehicle normally travelling in a forward direction.

7. Fuel tank according to claim 1, wherein said fuel tank is shaped as a parallelepiped, said first tank wall section being a front tank wall of the tank and said second tank wall section being a rear tank wall section with said fuel tank in a vehicle normally travelling in a forward direction.

8. Fuel tank according to claim 1, wherein said protrusions forming the calming chambers comprise pin-shaped, substantially cylindrical protrusion members which widen conically toward the surface of the first tank wall section, said pin-shaped protrusion members being arranged in rows at a mutual spacing from one another.

9. Fuel tank according to claim 8, wherein bar-like guide fins extend between respective rows of the pin-shaped protrusions.

10. Fuel tank according to claim 7, wherein said protrusions forming the calming chambers comprise pin-shaped, substantially cylindrical protrusions members which widen conically toward the surface of the first tank wall section, said pin-shaped protrusion members being arranged in rows at a mutual spacing from one another.

11. Fuel tank according to claim 10, wherein said bar-like guide fins extend between respective rows of the pin-shaped protrusions.

12. Fuel tank according to claim 11, wherein said guide fins extend obliquely to the vertical and mutually parallel to one another.

13. Fuel tank according to claim 12, wherein bar-like baffles are provided between the guide fins and extend obliquely with respect to the guide fins.

14. Fuel tank according to claim 13, wherein the pin-shaped protrusion members, the bar-like baffles, and the guide fins are all mounted on the interior surface of the tank wall means.

15. Fuel tank according to claim 13, wherein the pin-shaped protrusions members, the bar-like baffles and the guide fins are all mounted on a tank insert applied to the tank wall means, said tank insert being attached to the tank wall means.

16. Fuel tank according to claim 8, wherein the depth of the calming chambers is approximately 10 mm.

17. Fuel tank according to claim 8, wherein the pin-shaped protrusions exhibit a diameter of approximately 2 mm.

18. Fuel tank according to claim 1, wherein said first tank wall section is a vertically extending front tank wall of a fuel tank in a vehicle.

19. Fuel tank according to claim 7, wherein said fuel tank wall sections are formed of molded plastics, and wherein said protrusions forming the calming chambers are molded integrally on the first tank wall section.

20. Fuel tank according to claim 7, wherein said fuel tank wall sections are formed of metal, and wherein said protrusions forming the calming chamber are provided on a plastic insert which is attachable to the first tank wall section.

21. Fuel tank according to claim 1, wherein said fuel calming chambers are arranged honeycomb fashion with honeycomb fin walls surrounding the chambers.

22. Fuel tank according to claim 21, wherein said honeycomb fin walls include intersecting vertical and horizontal fin walls.

23. Fuel tank according to claim 22, wherein said vertical and horizontal fin walls have different respective heights with respect to the surface of said first tank wall section.

24. Fuel tank according to claim 21, wherein said fin walls including apertures for communication immediately adjacent calming chambers with one another.

25. Fuel tank according to claim 21, wherein bottom apertures are found at bottom walls of said chambers.

* * * * *